United States Patent
Narayanan

[11] Patent Number: 5,980,120
[45] Date of Patent: Nov. 9, 1999

[54] FIBER ARRAY TEST METHOD AND APPARATUS

[75] Inventor: Chellappan Narayanan, Alpharetta, Ga.

[73] Assignee: Lucent Technologies Inc., Murray Hill, N.J.

[21] Appl. No.: 08/936,416

[22] Filed: Sep. 25, 1997

[51] Int. Cl.[6] .................................................. G02B 6/36
[52] U.S. Cl. ................................................................ 385/89
[58] Field of Search .................................................. 385/89

[56] References Cited

U.S. PATENT DOCUMENTS

| | | | |
|---|---|---|---|
| 4,488,773 | 12/1984 | Wagner | 350/96.2 |
| 4,730,928 | 3/1988 | Gabriel et al. | 356/373 |
| 4,812,646 | 3/1989 | Waszkiewicz | 250/227 |
| 5,677,973 | 10/1997 | Yuhara et al. | 385/90 |

OTHER PUBLICATIONS

Ozawa et al. (High–Speed Measuring Equipment of Fiber Core Position of Optical Fiber Array Using Piezo Actuator, IEEE International Conference on Robatics and Automation), pp. 672–678, 1995.

*Primary Examiner*—John D. Lee
*Assistant Examiner*—Victoria D. Hao

[57] ABSTRACT

Disclosed is an apparatus for testing an array of optical fibers. According to the invention, modulated light is projected through individual fibers of a fiber array onto a photo-sensitive position sensor. The photo-sensitive sensor will provide position information relative to the position of the light projected upon its surface to a system computer. The positions of the optical fibers within the array relative to each other may thus be found. A loop is introduced into the optical fibers to lower the wavelength at which the fiber is multi-moded. The actual positions of the optical fibers are compared to desired positions and the fiber array is accepted or rejected based on whether it meets predetermined limits.

18 Claims, 7 Drawing Sheets

FIBER ARRAY TEST METHOD AND APPARATUS

FIELD OF THE INVENTION

This invention relates to the field of fiber optics, and more particularly, to the field of measuring the location of optical fibers within a fiber array.

BACKGROUND OF THE INVENTION

Communications network providers are rapidly converting from coaxial and other hardwire based networks to fiber optic technology. Literally thousands of miles of electric cables are being replaced by optical fibers. Among the advantages that fiber optic technology provides are greater bandwidth, less power consumption, greater reliability, and vastly increased signal carrying capacity.

During the installation of optical fibers, it is often necessary to mate two different optical fibers which are only a few microns in diameter. With optical fibers this small, special technology is used to ensure that the fibers mate up properly. If a particular coupling is off center by so much as a single micron, then part of the light signal traveling through the coupling may be lost, resulting in a loss of power and a weakened signal.

One technology used to couple optical fibers is a fiber array. A fiber array is contained in a rectangular device comprising two separate silicon halves with grooves running lengthwise formed on one side of each half. The silicon halves are sandwiched together such that the grooves mate up. An optical fiber which usually comprises a core and a cladding is encased between each mated pair of grooves. An epoxy substance is then injected in the spaces left between the optical fiber and the mated pair of grooves which holds the optical fiber in place and acts as an adhesive holding the two silicon halves together, with the optical fibers extending out of the rear end of the fiber array. The front of the fiber array is then polished so that it may be mated with opposing fiber optics.

If the front polished face of the fiber array is examined, one can observe the alignment of the optical fibers encased between the silicon halves. Ideally, the centers of the optical fibers should fall along the same horizontal centerline at predetermined points or vertical centerlines intersecting the centerline at equally spaced intervals. It is desirable that the centers of the optical fiber cores line up with their respective vertical and horizontal centerlines to within a tolerance of approximately one half of a micron.

In practice the placement of the optical fibers along the centerlines within a tolerance of a one half of a micron is very difficult to achieve. There are a multitude of inaccuracies that may be introduced during the manufacture of optical fiber, the cladding, and the silicon halves, as well as the ultimate assembly of the fiber array.

In particular the outer diameter of the optical fibers may not be perfectly round or the proper size, being more elliptical in shape. The core of the optical fiber may not be concentric with the center of cladding of the optical fiber. Also, the groove width may be imprecise resulting in mismatches between the grooves in the opposing silicon halves. Additionally, inaccuracies may be introduced in the assembly process where debris may be encased in the fiber array with the epoxy substance, forcing the optical fibers off center.

The end result of these problems either singly or in combination may be that the center of the fiber optic core will not fall at the location of the intersection of the horizontal and vertical centerlines as desired. Consequently, a defective fiber array may be created and placed into use that does not meet the 0.5 micron tolerance. When in use, these defective fiber arrays will not align properly with an abutting fiber array and energy will be lost as part of transmission signal will not transmit across the connection.

In order to determine those fiber arrays which are acceptable for use in a fiber network, an inspection process is employed with high precision equipment. The typical machine employed features a microscope which views the front face of the fiber array which is clamped to a movable stage. The front face of the fiber array is oriented so as to be perpendicular with the center axis of the microscope. The microscope is used to view the placement of the optical cables relative to each other. A single cable is examined at a time as the stage is moved such that the optical fibers are scrolled past the objective lens of the microscope. The movement must be of high precision and is measured so that the location of the optical fibers in the array may be determined relative to each other.

Among the drawbacks of this inspection apparatus is the fact that it is extremely difficult to ascertain the placement of the optical fibers within the array to within a tolerance of 0.5 microns. In particular, the moveable stage may not be able to position itself to within a tolerance of 0.5 microns, thereby compromising the accuracy of the inspection. The construction of the stage must be accomplished according to extremely tight tolerances, making such equipment extremely expensive. Also, the front face of the fiber array must be perfectly perpendicular to the axis of the objective lens in order to ensure the accuracy of the positioning data. These problems and more will result in inaccurate inspection of fiber arrays. Consequently, fiber arrays may pass inspection which should not, and others will not pass inspection when they should. Ultimately, losses are experienced in the field where defective arrays are employed, as well as the fact that useable arrays are rejected.

The foregoing shows there is a need to accurately measure the placement of the optical fibers within the fiber array to avoid these problems.

SUMMARY OF THE INVENTION

The foregoing problems are addressed in the instant invention which features a fiber array testing system to determine the placement of optical fibers within a fiber array. In accordance with the principles of the instant invention, a fiber array to be tested is aimed at a position sensitive photo-detector sensor. In the preferred embodiment, the fiber array is actually placed in contact with the sensor. Light is then introduced into the individual fibers one at a time and projected onto the sensor. The center positions of the individual light projections are determined relative to each other using a system computer which receives the light positioning data from the sensor. The computer system also controls the light source. The fiber array tested is then accepted or rejected depending on whether the positions of the optical fibers meet a predetermined tolerance.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
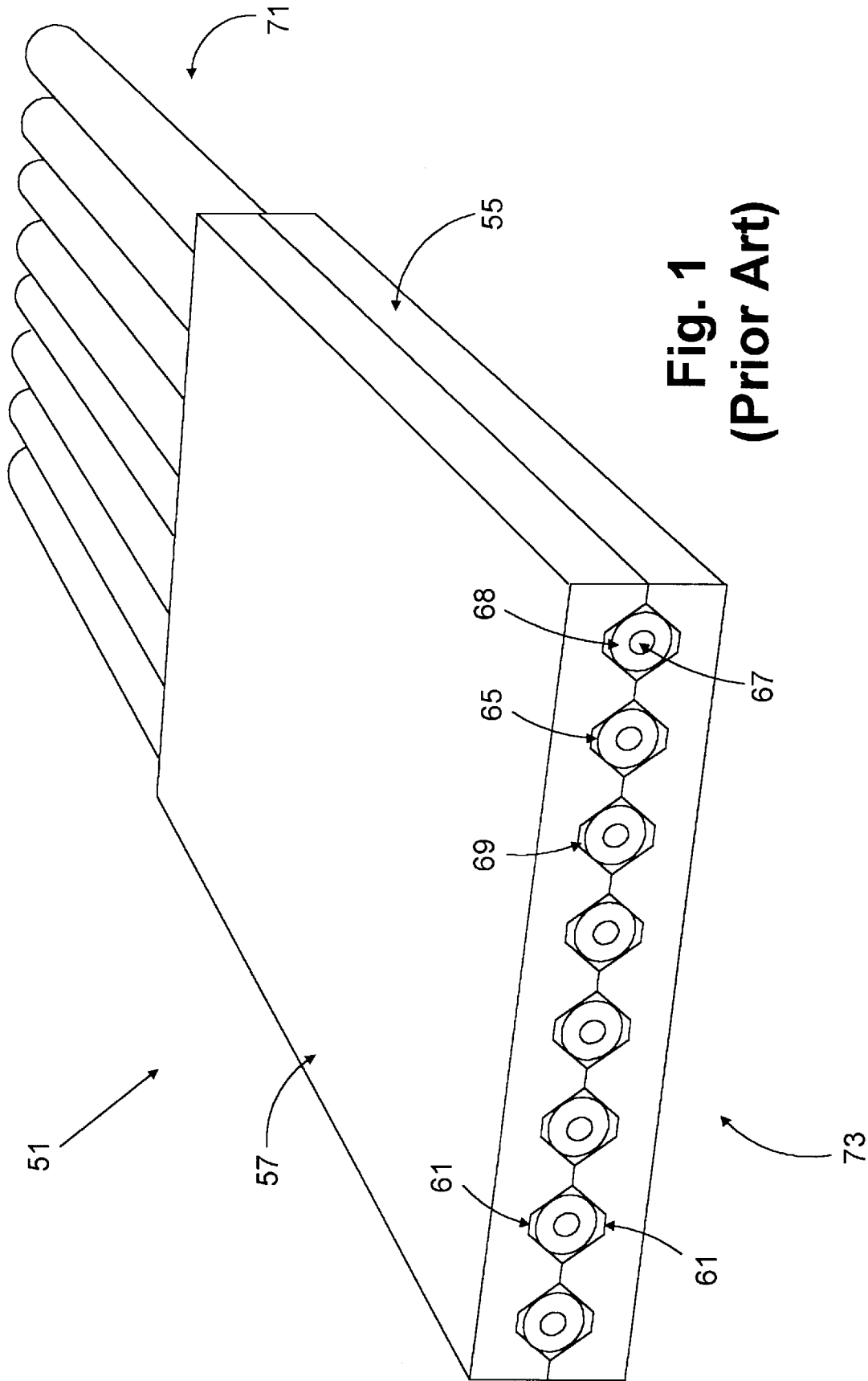
FIG. 1 is a drawing of a prior art fiber array.

Turning to FIG. 1, shown is a fiber array 51 used in coupling optical fibers according to the prior art. The fiber array 51 is a rectangular device comprising two separate silicon halves 55 and 57 with grooves 61 running lengthwise formed on one side. The silicon halves 55 and 57 are sandwiched together such that the grooves 61 mate up. An optical fiber 65 is encased between each mated pair of grooves 61. The optical fiber 65 is comprised of a core 67 and a cladding 68 as is customary in the art. An epoxy substance 69 is injected in the spaces left between the optical fiber 65 and the mated pair of grooves 61 to hold the optical fiber 65 in place and act as an adhesive holding the two silicon halves 55 and 57 together. The optical fibers 65 extend out of the rear 71 of the fiber array 51. The front 73 of the fiber array 51 is polished so that it may be mated properly with opposing fiber optics.

Figure 2:
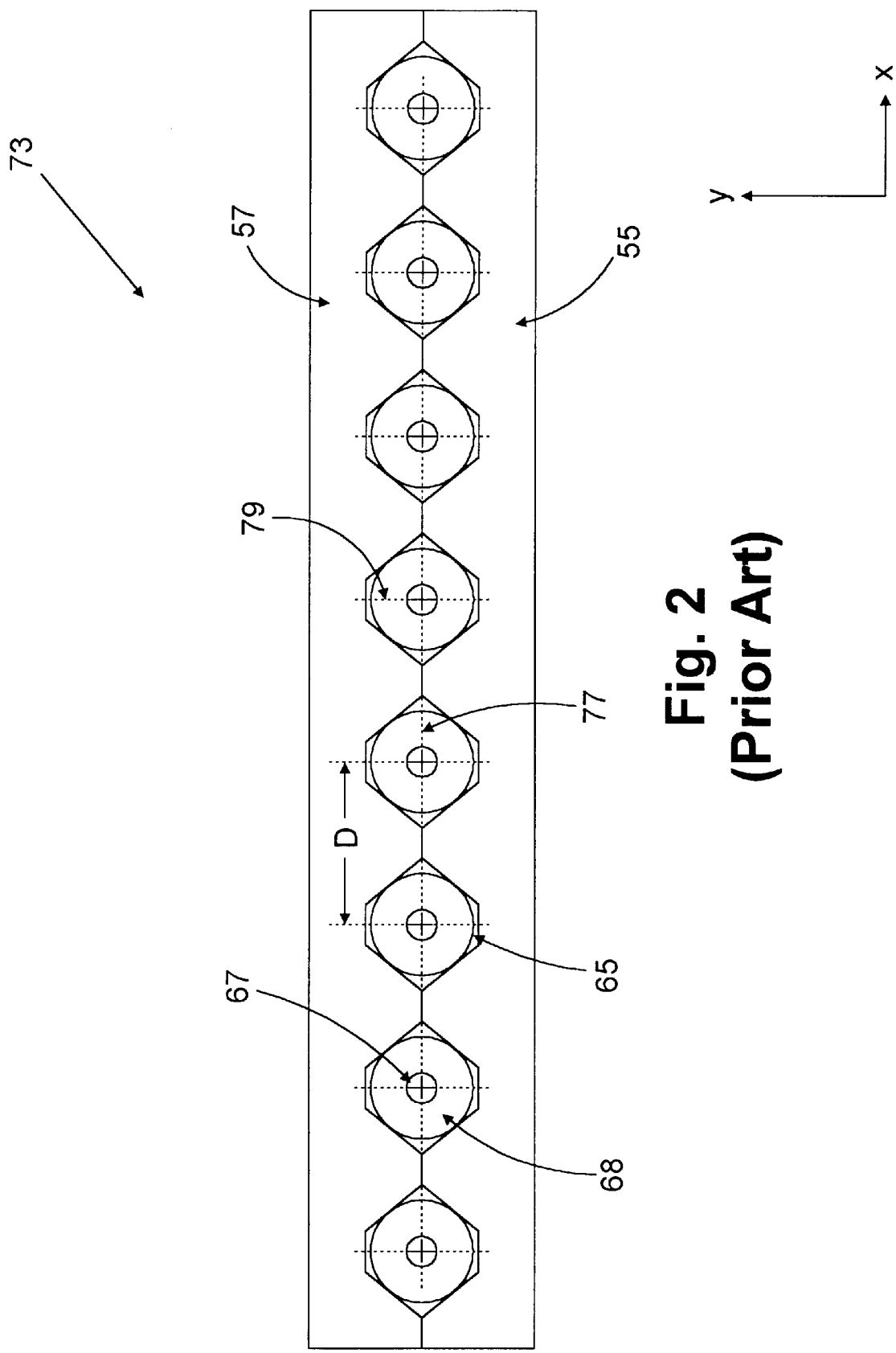
FIG. 2 is a drawing of the front face of the fiber array of FIG. 1.

Referring to FIG. 2, shown is a view of the front polished face 73 of the fiber array 51 of FIG. 1 which includes the alignment of the optical fibers 65 encased between the silicon halves 55 and 57. Running through the center of each optical fiber 65 and the fiber array 51 itself is horizontal centerline 77. Also, running through the individual optical fibers 65 are vertical centerlines 79. In the ideal situation, the centers of the cores 67 of the optical fibers 65 precisely line up with the intersections of the horizontal and vertical centerlines 77 and 79 as shown. In practice it is desirable that the centers of the fiber optic cores 67 line up with the centerlines 77 and 79 to within a tolerance of approximately one half of a micron. For example, the distance D between the centers of two adjacent optical fibers 65 along the horizontal axis x is generally 250 micrometers ±0.5 microns. The vertical y distance between the centers of the optical fibers 65 and the horizontal x axis is preferably less than or equal to 0.5 microns.

Figure 3:
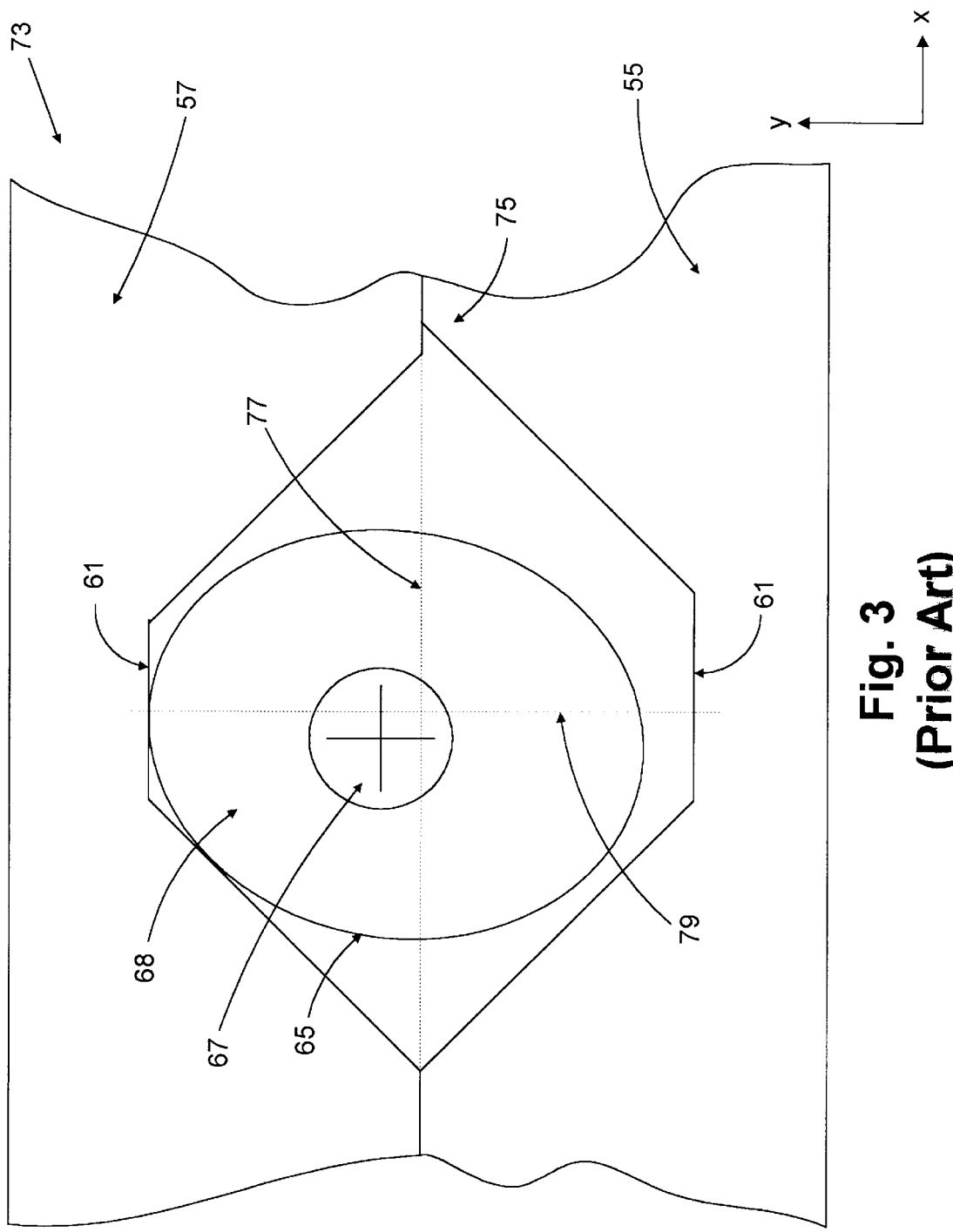
FIG. 3 is a drawing of a single fiber optic on the front face of FIG. 2.

While FIG. 2 may show the ideal, in reality the placement of the optical fibers 65 along the centerlines 77 and 79 within a tolerance of a one half of a micron is very difficult to achieve. There are a multitude of inaccuracies that may be introduced in the manufacturing of the optical fibers 65, the silicon halves 55 and 57, as well as the ultimate assembly of the fiber array 51. In FIG. 3, these inaccuracies have been exaggerated for clear understanding.

In FIG. 3, a cut-away of the front 73 of the fiber array 51 (FIG. 1) is shown with a blowup of a single optical fiber 65 illustrating the numerous inaccuracies which might occur during fabrication. First, the outer diameter of the optical fiber 65 may not be perfectly round or the proper size. For example, the cladding shown in FIG. 3 is more elliptical in shape than circular. The fiber optic core 67 may not be concentric with the center of the fiber optic cladding 68 as shown. Also, the groove width may be imprecise resulting in mismatches 75. Inaccuracies may be introduced in the assembly process where debris may be encased with the optical fiber 65, forcing it off center. The consequences of these problems, either singly or in combination, may be that the center of the fiber optic core 67 will not line up with the centerlines 77 and 79, thereby making a precise match-up with connecting arrays virtually impossible.

Figure 4:
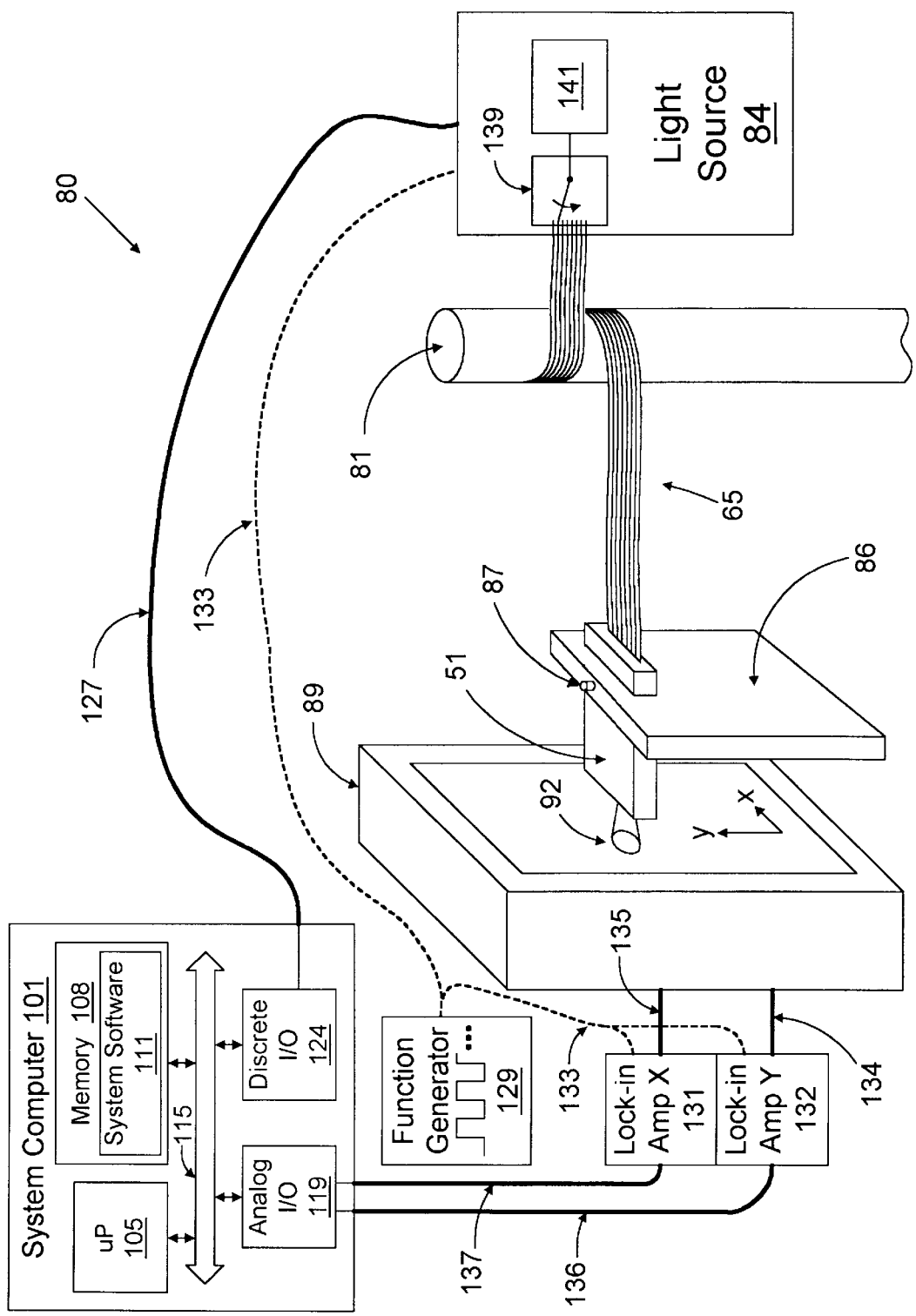
FIG. 4 is a drawing of the fiber array testing system according to the instant invention.

Turning now to FIG. 4, there is shown an overall view of the preferred embodiment of the fiber array testing system 80 of the invention. Shown is the fiber array 51 from which extend the optical fibers 65. The optical fibers 65 are wrapped around the column 81 and then connected to the light source 84, generally and preferably a laser. The fiber array 51 is held by suitable means 86 with clamping means 87 so as to point the fiber optics 65 encased within (see FIG. 1) toward the optical sensor 89. Although it does not appear that the fiber array 51 is in contact with the sensor 89, in the preferred embodiment, the fiber array 51 is actually held against the sensor 89 for reasons discussed hereinafter. The light source 84 will project light through any one of the optical fibers 65 and on to the sensor 89, the projected light 92 appearing as a circle against the sensor 89.

Generally, the system computer 101 may be an all purpose microprocessor based system as shown. Included within the system computer is a microprocessor 105 with memory 108 on which is stored system software 111. The microprocessor 105 and the memory 108 are linked by a data bus 115. Also included within the system computer 101 is an analog input module 119 and discrete input/output module 124, both of which are linked to the data bus 115. The microprocessor 105 may access data from both the input/output modules 119 and 124, as well as the memory 108 through the data bus 115. The discrete input/output module 124 is electrically coupled to the light source 84 via an electrical cable 127.

Also shown is function generator 129 which is electrically coupled to the light source 84 and the lock-in amplifiers 131 and 132 via cable 133. The lock-in amplifiers 131 and 132 in turn receive an x and y output signal from the sensor 89 via cables 134 and 135, and send an output signals to the analog input module 119 of computer system 101 via cables 135 and 136.

In the preferred embodiment, the light source 84 features an optical switch 139 which will direct light from single laser 141 or other light generating apparatus. The power of the laser light is approximately −5 to −10 dbm. The optical fibers 65 are connected to the output of the optical switch 139. In the preferred embodiment, light is then directed to one of the individual fibers based upon control criteria relayed by the system computer 101 via the discrete I/O 124. It would be possible to control the light source 84 through other electronic means such as a signal through a parallel port or other type of signal as is known to those skilled in the art. Ultimately, the system computer 101 will direct the optical switch 139 in such a way that light is projected through the desired optic cable 65. Also, it would be possible that the light source 84 include multiple lasers 141 or other light generators that are connected to an individual optical fiber 65. In such a case, the system computer 101 would determine the optical fiber 65 through which to project the light by activating the appropriate laser 141 or light generator to which the desired optical fiber 65 is connected.

Next, the operation of the above system is described. The function generator 129 creates a square wave signal which is sent to both the light source 84 and the lock-in amplifiers 131 and 132 via cable 133. The signal may also be a sine wave or other form, however, a square wave is preferable. The square wave received from the function generator 129 is used to modulate the amplitude of the light source. According to the preferred embodiment, the frequency of the square wave is approximately 1 Khz., although different frequencies may be used. The optical switch 139 will then direct the modulated laser light through one of the optical fibers 65. The projected light 92 falls on to the front surface of the sensor 89. The sensor 89 then determines the precise x and y position of the center of the projected light 92 relative to the boundaries of the detector. This position information is sent to the lock-in amplifiers 131 and 132 as x and y signal outputs with a frequency equal to that of the output signal from the function generator.

Using the square wave output from the function generator 129 as a reference, the lock-in amplifiers 131 and 132 tune themselves to the frequency of the signal output from the sensor 89 and filters the x and y signals with bandpass filters centered at that frequency. Further electronics in the x and y lock-in amplifiers 131 and 132 further convert the square wave signals into DC voltage signals or DC current signals proportional to the x and y position of the incident light 92 on the sensor 89. These signals are generally proportional to the peak voltage of the x and y square wave outputs of the sensor 89 are sent to the system computer via cables 136 and 137. In this way, unwanted signal noise generated by unwanted light that falls on the sensor is filtered out and the resulting position signal is received with much greater accuracy. Although DC voltage or current signals may be used, it is preferable to use DC current signals for greater accuracy as such a signal is less susceptible to distortion by nearby electrical equipment as known in the art.

The DC voltage signals or DC current signals are then sent to the system computer 101 for processing. The system then cycles to the next optical fiber 65 and repeats the procedure. This is accomplished by manipulating the optical switch 139 via a discrete signals received from the system computer 101 through the discrete input/output 124 as directed by the system software 111. Only one optical fiber 65 is tested at a time so that the sensor 89 may ascertain the center of that particular light emission without interference from the emissions from other optical fibers 65. Ultimately, the horizontal x and vertical y position information for the projected light 92 of each optical fiber 65 is determined and stored in the memory 108 of the system computer 101 for further processing.

Figure 5:
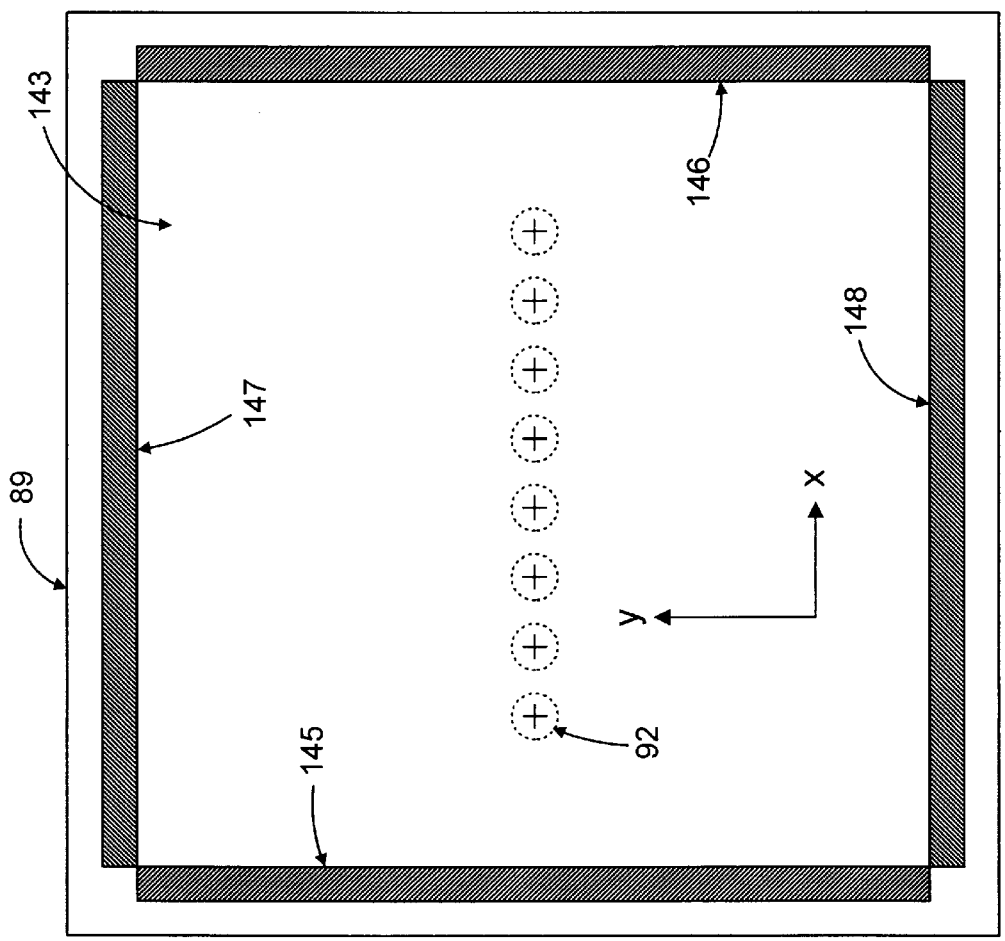
FIG. 5 is a drawing of the sensor employed in the preferred embodiment.

Referring now to FIG. 5, the front surface of the sensor 89 is shown. The sensor 89 is a position sensitive photo-detector as is known to those skilled in the art, and consists of a first transparent resistive sheet 143 placed on the top and a second transparent resistive sheet (not shown) on the bottom of a sheet of doped silicon (not shown). Such a sensor with two resistive sheets is called duo lateral. Electrodes 145 and 146 are connected to one of the sheets, while electrodes 147 and 148 are connected to the remaining sheet. When light is emitted through the transparent resistive sheet 143, electric current is generated in the sheet of doped silicon. This current will attempt to find the path of least resistance to one of the electrodes 145 and 146, or 147 and 148. The current will then be conducted from any one of these electrodes to a common positive terminal (not shown).

Figure 6:
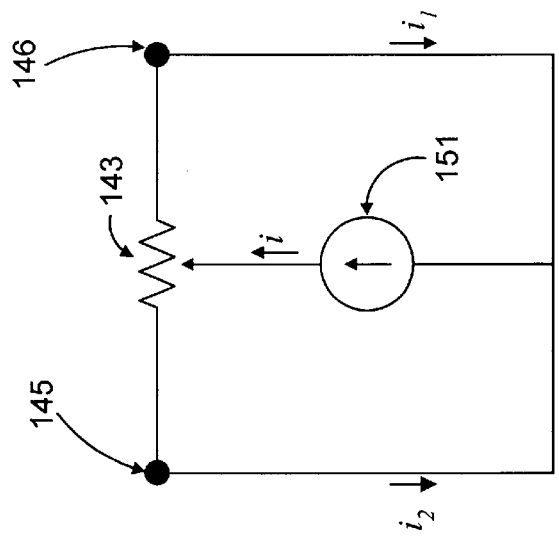
FIG. 6 is a schematic of an equivalent circuit of the sensor of FIG. 5.

FIG. 6 shows an equivalent circuit with electrodes 145 and 146, the resistive sheet 143 and current source 151. The current source 151 represents the current generated by the underlying doped silicon (not shown). When current i is generated, currents $i_1$ and $i_2$ flow through electrodes 145 and 146. The magnitude of currents $i_1$ and $i_2$ will depend upon the location of the projected light 92 on the resistive sheet 143 as known by those skilled in the art. Thus the horizontal position of the projected light 92 upon the resistive sheet 143 is determined from the value $i_1-i_2$ which will fall on a curve which plots position vs. the value of $i_1-i_2$ as known to those skilled in the art. Note that the vertical position of the projected light 92 is determined in the same manner via electrodes 147 and 148.

Ultimately, the precise location of the projected light 92 is determined by calculating the ratio of $i_1-i_2$ over $i_1+i_2$ for a particular pair of sensors 145 and 146 (the x direction), or 147 and 148 (the y direction). The position of the projected light 92 is proportional to the normalized current. The ratio above is determined so as to eliminate the noise created due to fluctuation of the intensity of the projected light 92.

Note that it is possible that sensor 89 could be of the type which incorporates a single resistive sheet with four electrodes connected to it. Such a detector is referred to as tetra-lateral. The operation of such a sensor would be very similar to that of a two resistive sheet sensor. Also, it is possible to employ four lock-in amplifiers rather than the two shown in FIG. 4 (lock-in amplifiers 131 and 132). In such a case, each lock-in amplifier would be connected to a single electrode. The normalizing of the x and y positions of the incident light 92 (FIG. 4) would be performed by the system computer 101.

Referring back to FIG. 5, the sensor 89 will thus provide two voltage signals that are proportional to the horizontal and vertical position of the projected light 92. These signals will provide the location of the center of the projected light 92 as known to those skilled in the art. In the case of the preferred embodiment, the shape of the projected light 92 against the sensor should be symmetrical with regard to the x and y axes so that an actual center position may be ascertained. In the preferred embodiment, the projected light 92 has a gaussian profile as known in the art.

Another concern is that the entire area of the projected light 92 lay within the electrodes 145, 146, 147, and 148 so that the center point determined by the sensor 89 will accurately reflect the center of the projected light 92. The light that is projected from the optical fiber will appear conical, where the profile of the projected light 92 will expand as it gets further away from the end of the optical fiber due to the diffraction of light as known by those skilled in the art. Thus it is preferable that the fiber array 51 be held by the fixture 86 as close as possible to the sensing surface of the sensor 89 to prevent the diffraction of light such that the area of the projected light 92 falls beyond the electrodes 145, 146, 147, and 148. In the preferred embodiment, the front face of the fiber array 51 is actually in contact with the sensor 89.

With reference to the system of FIG. 4, the function of the column 81 is as follows. The sensor 89 is composed of a p-n junction in silicon which, upon the introduction of light, will generate electrical current. The peak response wavelength of the light for such silicon based sensors is approximately 980 nm. The optical fibers 65 to be used in telecommunications applications are designed to conduct light at frequencies of around 1300 nm and 1550 nm as known by those skilled in the art. The optical fibers 65 are accordingly designed so as to be single mode in any frequency above 1100 nm to prevent unwanted signal distortion due to the creation of several modes as know to those skilled in the art. Below 1100 nm, the optical fiber 65 will propagate multiple modes which is also known to those skilled in the art.

However, in the case of the preferred embodiment, the light emitted from the light source 84 should be approximately 980 nm in order for the sensor 89 to determine most efficiently the location of the projected light 92. Since the wavelength of the light emitted by the light source 84 is 980 nm, multiple modes may be created in the optical fiber 65, depending on the angle at which the laser light enters the optical fiber 65 from the optical switch 139 as known by those skilled in the art. This presents a problem in that a multiple mode light signal will not create uniformly shaped projected light 92 from which the sensor may determine the position information. Instead there may be multiple asymmetrical spots of light rather than a uniform round image of projected light 92 from which a center point may be easily determined. Consequently, the threshold of 1100 nm at which the optical fiber 65 is single moded must be lowered to below 980 nm so that the projected light 92 is in a form from which an accurate center position may be determined by the sensor 89.

This is accomplished by introducing a loop in the optical fiber 65 by means of column 81. In the preferred embodiment, the diameter of this loop is approximately one inch. Thus column 81 is constructed with a diameter of one inch and the optical fibers 65 are wrapped around the column to create the desired loop. This will eliminate any unwanted modes by lowering the threshold to approximately 900 nm as known by those skilled in the art. In this manner, the shape of the projected light 92 is kept uniform closely reflecting the dimensions of the optical fiber 65 when the fiber array 51 is placed up against the sensor 89. Column 81 may take any of a number of forms and may be made of any of a number of materials. It is shown here as a preferred means of introducing and maintaining a loop in the optical fibers 65 under test.

The sensor 89 may be composed of materials other than silicon which would eliminate the need for the column 81 and the loop in the optical fibers 65. For example, an Indium-Gallium-Arsenide (InGaAs) based sensor may be employed which will detect light with wavelengths of 1300 nm and 1500 nm. Light at these wavelengths will not propagate multiple modes in the optical fibers 65. Thus the need for the loop around the column 81 to lower the wavelength at which the optical fibers 65 are single moded is eliminated.

Figure 7:
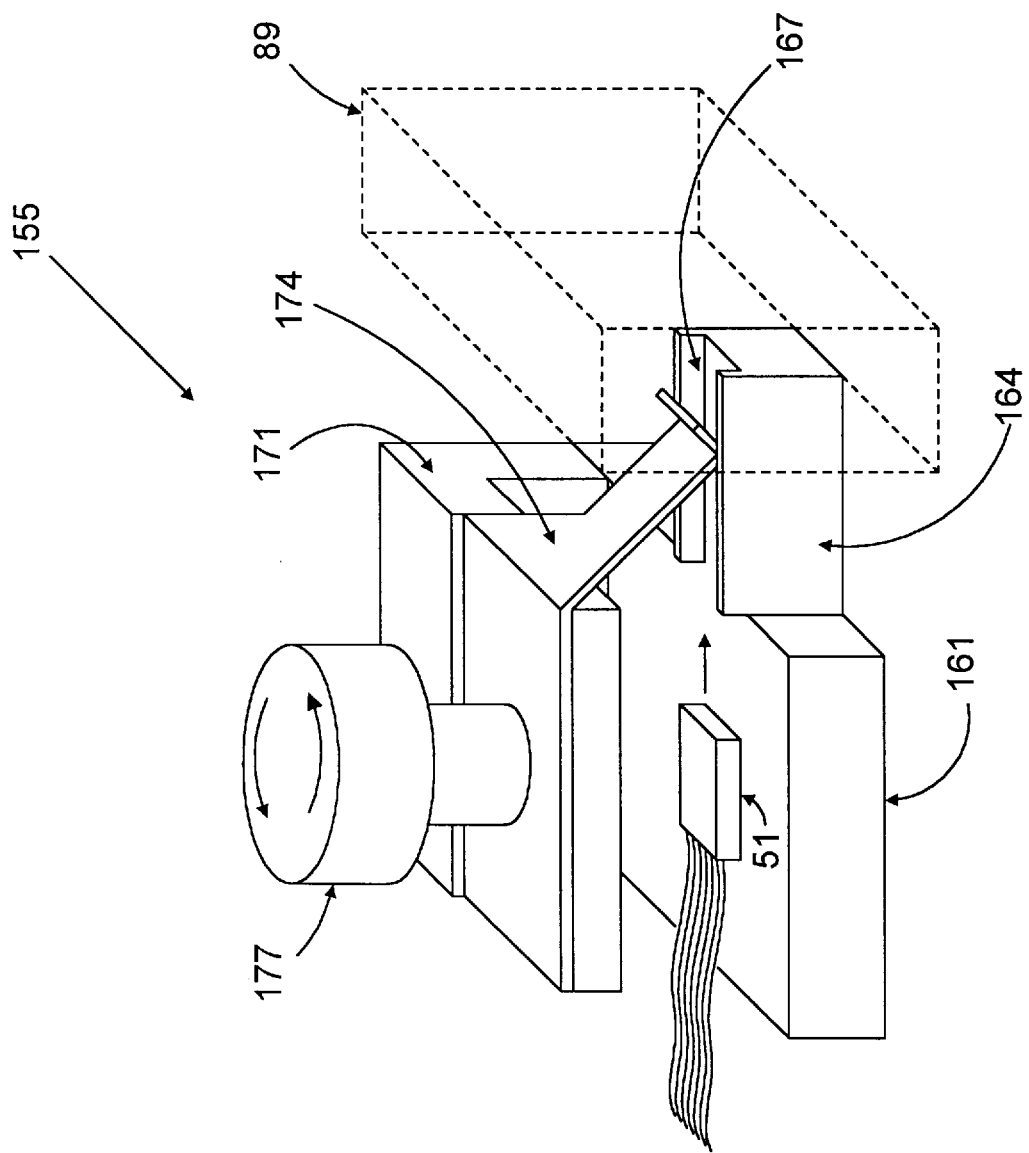
FIG. 7 is a drawing of the fixture in which the fiber array of FIG. 4 is held.

Finally, turning to FIG. 7, a view of a fixture 155 which may be used to hold the fiber array 51 against the sensor 89 (FIG. 4). The fixture 155 is made of a base 161 with an extended portion 164 which features a slot 167. Mounted on the base is an upper portion 171. The upper portion 171 serves to hold the clip 174 which is fastened to the upper portion 171 using a knob 177 which screws into the upper portion through a hole in the clip 174. The knob 177 is preferably large enough to fit within the palm of an individual's hand for easy loosening and tightening during repetitive inspection of fiber arrays 51. The extended portion 164 is in close proximity to the sensor 89.

During operation, the knob 177 is loosened and the fiber array 51 is fed into the slot 167 under the clip 174 until it mates with the sensor 89. Thus the fixture 155 must be placed so as to be in close proximity of the sensor during operation. The knob 177 is then tightened and the clip 174 will secure the fiber array 51 in the slot 167. At that point, the fiber array 51 is inspected according to the previous discussion. After the placement of the optical fibers within the fiber array 51 is ascertained, the knob 177 is loosened and the fiber array 51 is removed from the slot 167. The clip 174 is designed to exert an amount of force, herein defined as the "retaining force," against the fiber array 51 to hold it in place during the inspection process. The retaining force must be large enough to firmly hold the fiber array 51 in place, but not too large so as to crush or damage the fiber array 51. Also, the size of the knob 177 is chosen to fit within the palm of one's hand to facilitate easy removal or clamping with a minimum of torque applied so as to relieve stress on the hands of inspection personnel who must perform the task repetitively.

Figure 8:
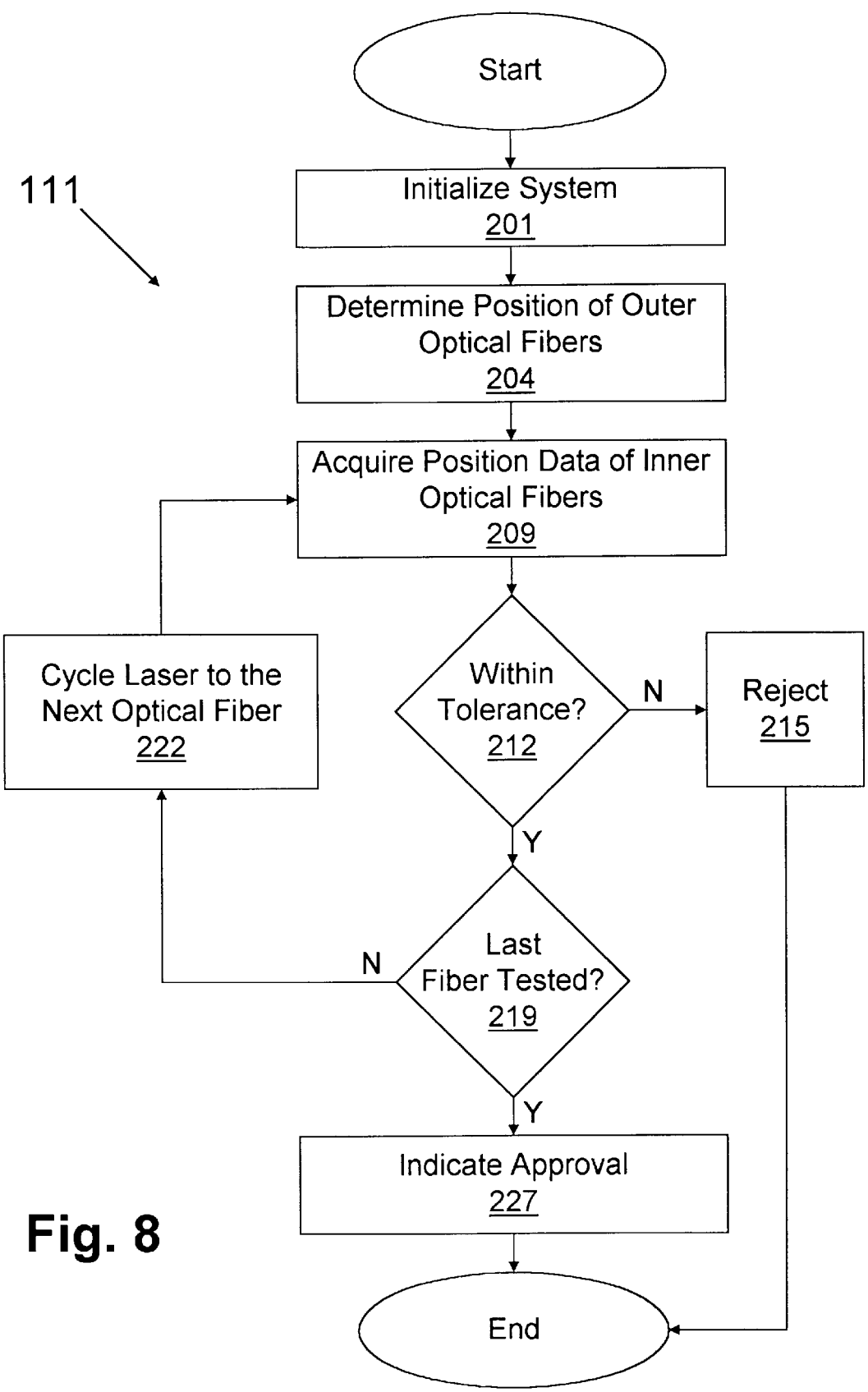
FIG. 8 is a block diagram of the computer logic according to the instant invention.

Turning to FIG. 8, a flowchart illustrating the general operation of the computer software 111 executed by the computer system 101 is shown. In block 201 the system is initialized for operation as known to those skilled in the art. The initialization may include the input of the number of optical fibers 65 (FIG. 4) that are in the fiber array 51 (FIG. 4) to be tested. In block 204, the positions of the two outermost optical fibers 65 are determined. Once the positions of the centers of the two outermost optical fibers 65 (FIG. 4) are determined, the horizontal centerline 77 (FIG. 2) may be ascertained. Also, the vertical centerlines 79 (FIG. 2) of each optical fiber 65 are also calculated. In block 209, the position of an inner optical fiber 65 is ascertained. This is done by causing the light source to emit light through the chosen optical fiber 65 via the discrete input/output 124 (FIG. 4).

Once the position of the inner optical fiber 65 is ascertained, in the next block 212 it is determined whether the inner optical fiber 65 is positioned within an acceptable tolerance. In the preferred embodiment, this tolerance is 0.5 microns in both the horizontal and vertical directions. If the optical fiber 65 tested is not within the 0.5 micron tolerance, than the unit is rejected and the program is at an end. If the optical fiber 65 tested is within the 0.5 micron tolerance, then the program progresses to block 219 to determine if the last optical fiber 65 has been tested. Note that this inquiry will depend upon the number of optical fibers 65 within the fiber optic array 51. If the optical fiber 65 tested is not the last one, then block 222 is performed where the system computer 101 (FIG. 4) will cause the light source 84 (FIG. 4) to cycle to the next optical fiber 65 to be tested. This is performed via the discrete input/output 124, however, it should be noted that this may be accomplished through some other control means such as a serial communications interface. In such a case, the light source 84 would house the necessary circuitry to interpret the serial communications. There are several other ways in which the light source 84 may be switched as known by those skilled in the art.

If the last inner optical fiber 65 has been tested, then in block 227, the system will indicate that the fiber array 51 tested is within tolerance and is approved for use. This indication may be by means of a cathode ray tube or simply a light indicator. There are many different ways of indicating approval as known by those skilled in the art.

It must be noted that it would be possible to create a dedicated circuit to perform the functions of the computer system 101, or for that matter, merely calculate the position information by hand based on the output of the sensor 89 while manually controlling the output of the light source 84. Also, one may employ a programmable logic controller or other similar computer control device.

Many variations and modifications may be made to the preferred embodiment of the invention without departing substantially from the spirit and principles of the invention. All such modifications and variations are intended to be included herein within the scope of the present invention, as defined by the following claims.

I claim:

1. An apparatus to determine the relative positions of a number of optical fibers within an optical fiber array, comprising:

a light source configured to direct a beam of light through the optical fibers within the fiber array, each of the optical fibers having an end terminating at a front face of the fiber array from which the beam of light is projected;

a position sensitive photo-detector positioned to intercept the beams of light, the position sensitive photo-detector generating a respective position signal indicative of a location of each of the beams of light projected thereon;

means for holding the fiber array, wherein the front face of the fiber array is positioned directly adjacent to the position sensitive photo-detector; and signal processing means for determining a number of positions of the ends of the optical fibers relative to each other on the front face of the fiber array based upon the respective position signals from the position sensitive photo-detector.

2. The apparatus of claim 1, further comprising a member with a predetermined peripheral length for creating a loop having a predetermined radius in the optical fibers for reducing a single mode frequency of the optical fibers.

3. The apparatus of claim 1, wherein the means for holding the fiber array further comprises an insertion slot and a clip.

4. The apparatus of claim 1, further comprising:

a modulator adapted to modulate an amplitude of the beam of light by a predetermined frequency; and means responsive to an electrical signal that is tuned to the predetermined frequency for filtering the position signal, thereby isolating the position signal from unwanted noise.

5. The apparatus of claim 4, wherein the means for filtering the position signal further comprises a lock-in amplifier.

6. The apparatus of claim 1, wherein the fiber array is held in contact with the position sensitive photo-detector.

7. The apparatus of claim 1, wherein the light source is a laser.

8. The apparatus of claim 1, further comprising means for directing the beam of light through a selected one of the optical fibers.

9. The apparatus of claim 8, wherein the means for directing the beam of light through a selected one of the optical fibers further comprises an optical switch.

10. A method for determining a location of a number of optical fibers within a fiber array, comprising the steps of:

positioning the fiber array in front of a position sensitive photo-detector, wherein a front face of the fiber array directly faces the position sensitive photo-detector;

projecting light from a light source through each of the optical fibers and onto the position sensitive photo-detector; and determining an actual position of each of the optical fibers in the fiber array relative to each other by determining a position of the projected light from each of the optical fibers against the position sensitive photo-detector.

11. A method for determining a location of a number of optical fibers within a fiber array, comprising the steps of:

positioning the fiber array in front of a position sensitive photo-detector, the front of the fiber array facing the position sensitive photo-detector;

determining the actual positions relative to each other of a first optical fiber and a second optical fiber located on a first side and second side of the fiber array by projecting a light from the light source through the first and second optical fibers and onto the position sensitive photo-detector;

determining a number of desired positions relative to each other of a number of remaining optical fibers by calculating a horizontal centerline and a number of vertical centerlines based on the position of the first and second optical fibers on the first and second sides of the fiber array;

determining a number of actual positions relative to each other of the remaining optical fibers by projecting the light from the light source through the remaining optical fibers and onto the position sensitive photo-detector; and comparing the actual positions with the desired positions and rejecting or accepting the fiber array based on the comparison.

12. An apparatus to determine the relative positions of a number of optical fibers within an optical fiber array, comprising:

a light source configured to direct a beam of light through the optical fibers within the fiber array, each of the optical fibers having an end terminating at a front face of the fiber array from which the beam of light is projected;

a position sensitive photo-detector positioned to intercept the beams of light, the position sensitive photo-detector generating a respective position signal indicative of a location of each of the beams of light projected thereon;

a fixture configured to hold the fiber array, wherein the front face of the fiber array is positioned directly adjacent to the position sensitive photo-detector; and signal processing apparatus configured to determine a number of positions of the ends of the optical fibers relative to each other on the front face of the fiber array based upon the respective position signals from the position sensitive photo-detector.

13. The apparatus of claim 12, further comprising a member with a predetermined peripheral length to create a loop having a predetermined radius in the optical fibers.

14. The apparatus of claim 12, wherein the fixture further comprises an insertion slot and a clip.

15. The apparatus of claim 12, further comprising:

a modulator configured to modulate an amplitude of the beam of light generated by the light source by a modulation frequency; and a filter device configured to filter the position signals from the position sensitive photo-detector, the filter device being tuned to the modulation frequency, thereby isolating the position signal from unwanted noise.

16. The apparatus of claim 15, wherein the filter device further comprises a lock-in amplifier.

17. The apparatus of claim 12, wherein the fixture removeably holds the fiber array in direct contact with the position sensitive photo-detector.

18. The apparatus of claim 12, wherein the light source is a laser.

* * * * *